Sept. 2, 1941.  J. W. SWANSON  2,254,761

SEPTIC TANK

Filed Aug. 7, 1939

John W. Swanson
INVENTOR

BY W. B. Harpman
ATTORNEY

Patented Sept. 2, 1941

2,254,761

UNITED STATES PATENT OFFICE 2,254,761

SEPTIC TANK

John W. Swanson, Sharon, Pa.

Application August 7, 1939, Serial No. 288,727

1 Claim. (Cl. 210—6)

This invention relates to a sewage treating apparatus of the kind commonly known as septic tanks and in which the heavier and lighter parts of the sewage are separated and undergo certain changes due to bacteriological action within the tank.

The principal object of this invention is provision of the septic tank which is so constructed that the capacity of the tank may be utilized to best advantage for the settling of the sewage in that a relatively large settling area is provided and is equipped with a practical means for removing the natural accumulation of sludge without requiring that the tank be opened or otherwise disturbing the contents of the tank.

It is well known that after a septic tank has been in use over a period of years a considerable accumulation of sludge is formed in the bottom of the tank and that if this sludge is not removed it will seriously affect the efficient action of the tank and result in an unsanitary and undesirable condition. Heretofore it has been necessary to dig up the tank, open it and remove the sludge, it being obvious that this task requires considerable time and effort and usually results in the destruction of the lawn or shrubs under which the tank may be buried. In the invention shown and described herein I have provided a septic tank so designed that the sludge may be removed from time to time without digging up the tank or in any way disturbing the lawn or shrubs or disturbing the liquid contents of the tank itself. Means for accomplishing these objects are built within the tank at the time of the tank's installation.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein—

Figure 1:
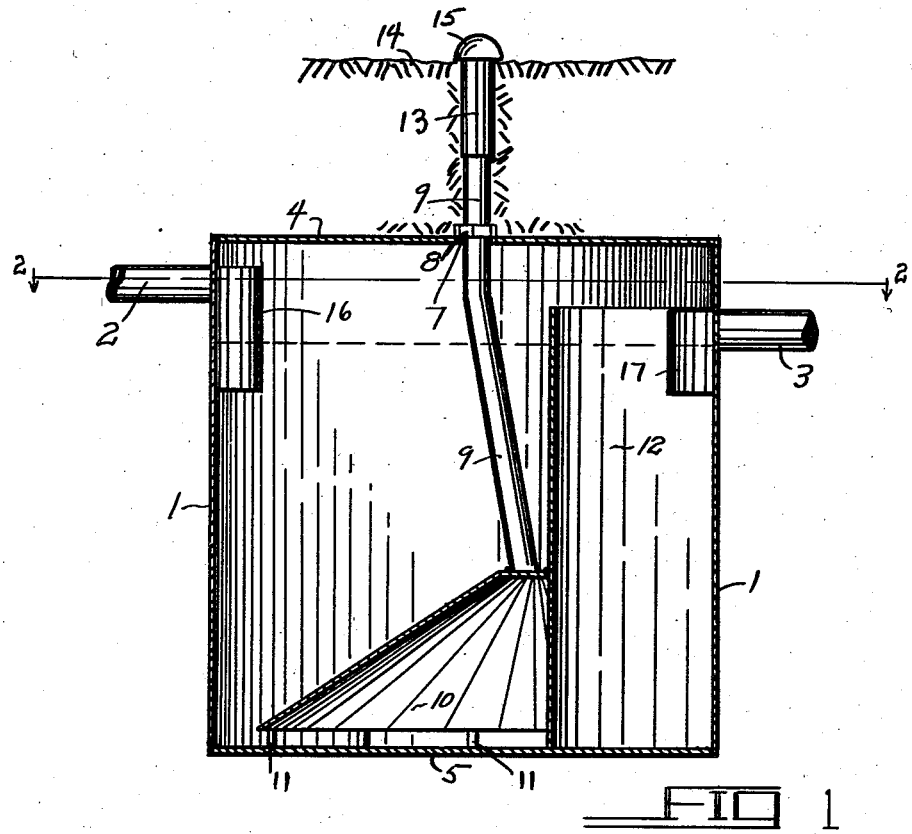
Figure 1 is a side elevation of my improved septic tank with parts broken away.

By referring to the drawing and Figure 1 in particular it will be seen that the invention comprises a septic tank 1 having a suitable inlet opening 2 and an outlet opening 3. The septic tank 1 is provided with a top 4 and bottom 5.

Positioned in the top 4 there is an opening 7 in which a fitting 8 has been placed which serves to suitably carry and surround a vertical tube 9 which extends downwardly into the tank and communicates with a semi-cone shaped sludge direction member 10. This sludge direction member 10 is shaped so as to form an inverted cone smaller in diameter than the tank. A plurality of legs 11 serve to position the bottom edge of this sludge direction cone slightly above the bottom 5 of the tank 1. The sludge direction member 10 does not cover the complete bottom area of the tank by reason of a baffle 12 which is positioned at one side of the tank and serves to form an effective partition to separate the lighter and heavier parts of the sewage. This baffle 12 is preferably welded to the sludge direction member 10 so as to form a liquid-tight joint.

By referring to Figure 1 it will be seen that a telescoping secondary tube 13 slidably engages the tube 9, the upper end of this secondary tube 10 continuing to the surface of the ground as indicated at 14 where a cap 15 is provided.

Figure 2:
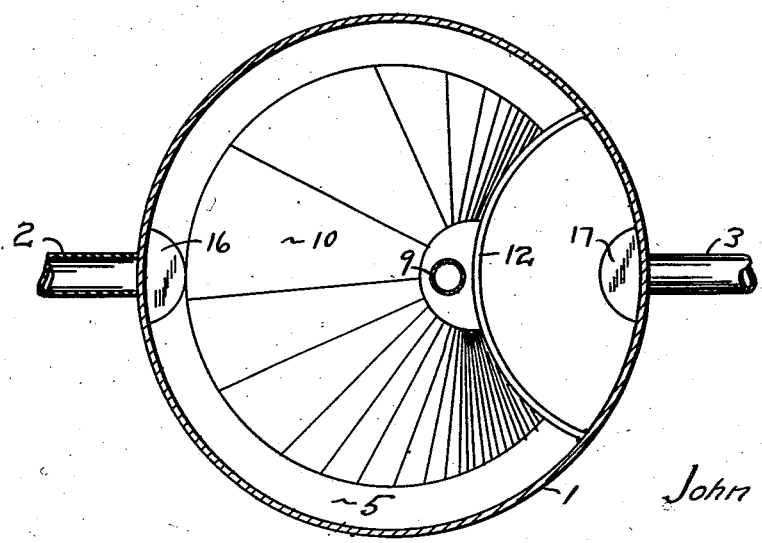
Figure 2 is a cross-sectional view taken on lines 2—2 of Figure 1.

By referring to Figure 2 of the drawing it will be seen that the sludge direction member 10 is slightly smaller than the inside diameter of the tank 1 so as to permit the settling sludge to slide downwardly between the tank 1 and the outer edge of the sludge direction member 10 where it can pass inwardly into the interior of the sludge direction member and from which location it can be readily pumped upwardly through a suction hose which may be inserted through the tubes 9 and 13.

It will be seen by referring to the drawing that suitable directional baffles 16 and 17 have been provided adjacent the inlet and outlet openings 2 and 3 so as to effectively prevent a direct flow of sludge across the tank. The lower portion of these directional baffles extend below the liquid level of the tank.

By referring to Figure 2 it will be seen that the sludge direction member 10 forms an effective means of directing and separating the sludge from the liquid in the tank. This sludge direction member 10 in connection with the tubes 9 and 13 insures the removal of the sludge from the bottom of the tank without disturbing the liquid therein.

It will thus be seen that I have provided a septic tank which combined an effective baffle for the positive separation of solids and liquids and provided means enabling the said solids in the form of accumulated sludge to be readily removed from the septic tank.

What I claim is:

In a septic tank having inlet and outlet openings and a partition dividing the tank into two compartments, a directional baffle positioned in the compartment adjacent the said inlet opening, said directional baffle comprising a semi-cone shaped member, means formed in the said tank for supporting the lowermost edge of the directional baffle slightly above the bottom of the said tank, the uppermost edge of the said directional baffle affixed to the said partition, said directional baffle adapted to direct sludge downwardly across the surface thereof so that the same can flow thereinunder. tubular connections communicating with the said baffle and extending upwardly through the said tank and outwardly therefrom.

JOHN W. SWANSON.